United States Patent [19]
Clayton, Jr. et al.

[11] Patent Number: 5,861,552
[45] Date of Patent: *Jan. 19, 1999

[54] CHASSIS DYNAMOMETER

[75] Inventors: William Clayton, Jr., San Marino; Dmitry Shchedrin, Arcadia, both of Calif.

[73] Assignee: Clayton Industries, El Monte, Calif.

[ * ] Notice: The term of this patent shall not extend beyond the expiration date of Pat. No. 5,445,013.

[21] Appl. No.: 897,197

[22] Filed: Jul. 21, 1997

Related U.S. Application Data

[60] Division of Ser. No. 437,670, Jun. 7, 1995, abandoned, which is a continuation-in-part of Ser. No. 424,259, Apr. 24, 1995, which is a continuation-in-part of Ser. No. 114,220, Aug. 30, 1993, Pat. No. 5,445,013.

[51] Int. Cl.$^6$ .................................................... G01L 3/26
[52] U.S. Cl. ................................................................ 73/117
[58] Field of Search .................................................. 73/117

[56] References Cited

U.S. PATENT DOCUMENTS

| | | | |
|---|---|---|---|
| 2,585,475 | 2/1952 | Lee et al. | 73/862.17 |
| 3,518,466 | 6/1970 | Bunner | 73/862.17 |
| 3,863,083 | 1/1975 | Jaeschke | 310/52 |
| 4,077,255 | 3/1978 | Murakami | 73/117 |
| 4,798,378 | 1/1989 | Jones | 272/72 |
| 4,852,574 | 8/1989 | Estaque | 310/105 |
| 4,982,127 | 1/1991 | Marandet | 310/105 |
| 5,086,647 | 2/1992 | Kamata et al. | 73/117 |
| 5,101,660 | 4/1992 | LaBelle | 73/117 |
| 5,154,076 | 10/1992 | Wilson et al. | 73/117 |
| 5,385,042 | 1/1995 | LaBelle | 73/117 |
| 5,445,013 | 8/1995 | Clayton, Jr. et al. | 73/117 |
| 5,450,748 | 9/1995 | Evans et al. | 73/117 |

*Primary Examiner*—Richard Chilcot
*Assistant Examiner*—Jewel Thompson
*Attorney, Agent, or Firm*—Harold L. Jackson

[57] ABSTRACT

A chassis dynamometer for testing motor vehicles in place includes a frame, at least one roll for engaging the wheel(s) driven by the vehicle engine and an eddy current brake/inertia unit in which the brake rotor is attached to one end of the roll to form an integral structure rotatably supported on the frame at each end of the structure.

7 Claims, 3 Drawing Sheets

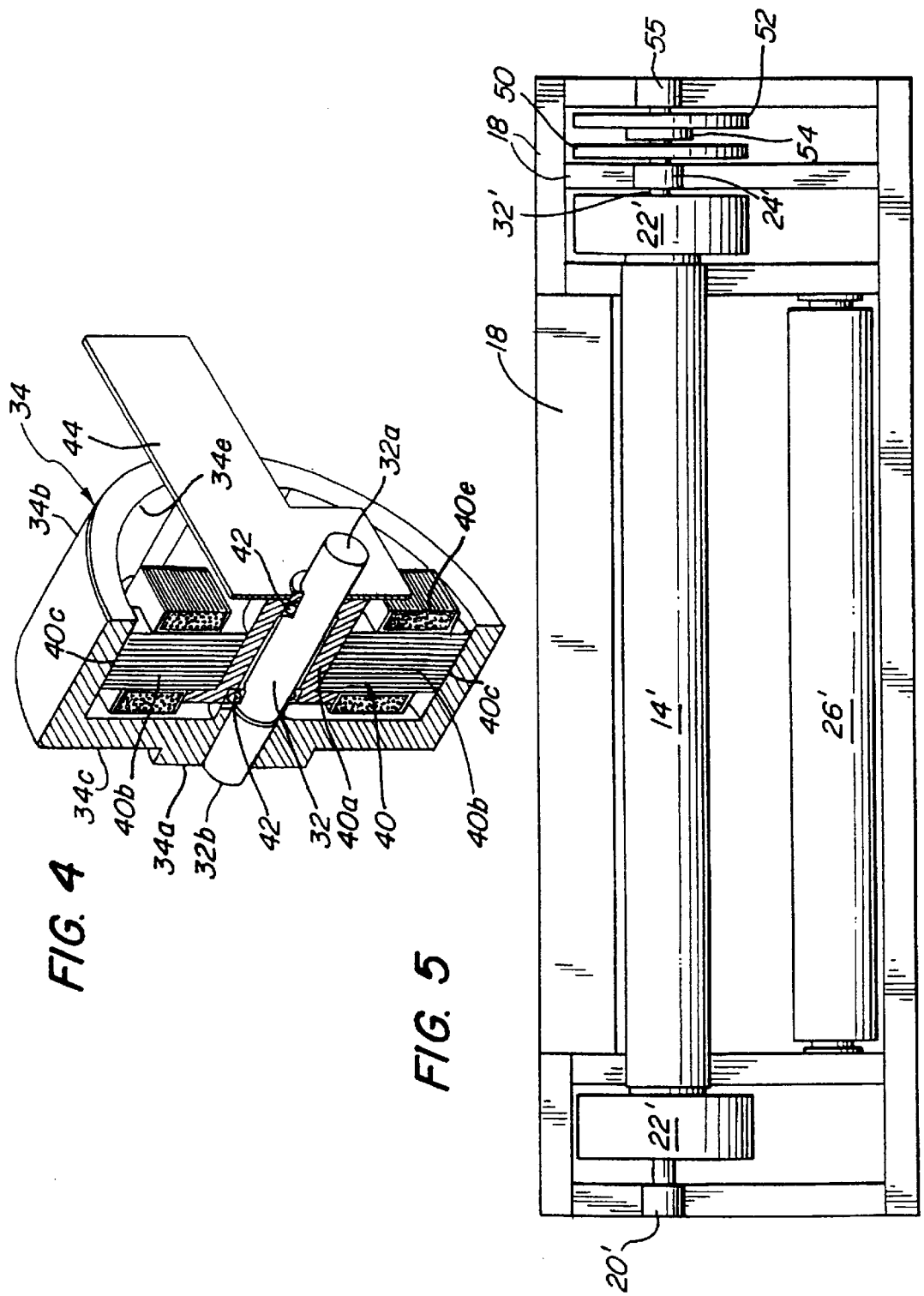

CHASSIS DYNAMOMETER

FIELD OF THE INVENTION AND RELATED APPLICATIONS

This invention relates to chassis dynamometers for simulating the inertia and road load forces encountered by motor vehicles under anticipated driving conditions and more particularly to such dynamometers which employ an eddy current brake as the power absorbing unit. This application is a division of application Ser. No. 08/437,670 for Chassis Dynamometer ("'670") filed Jun. 7, 1995, now abandoned which in turn is a continuation-in-part of U.S. application Ser. No. 08/424,259, ("'259") filed Apr. 24, 1995, which in turn is a continuation-in-part of U.S. application Ser. No. 08/114,220, ("'220") filed Aug. 30, 1993, now U.S. Pat. No. 5,445,013 for Dynamometer for Simulating the Inertial and Road Load Forces Encountered by Motor Vehicles and Method.

BACKGROUND OF THE INVENTION

Dynamometers are widely used for testing motor vehicles in place to permit fuel consumption, exhaust gas pollutants etc. to be measured. Since the test vehicles are not moving over a road bed, the dynamometer must simulate certain forces normally associated with actual vehicle operation. These parameters include forces associated with inertia (related to the mass or weight of the vehicle) and road load forces (related to the velocity of the vehicle). The vehicle engine (or its braking system) must overcome inertial forces in order to accelerate or decelerate the vehicle. In addition, the engine must overcome breakaway frictional and rolling frictional forces (i.e., road/tire friction) as well as windage forces (i.e., drag forces caused by air passing over the vehicle). These latter forces are commonly referred to as road load (RL) forces and may be represented by the formula:

$$RL = A + BV + CV^2 + DW$$

where A represents the vehicle constant load coefficient (e.g., effects of breakaway force), and, B and C represents the vehicle load coefficient dependent on velocity and velocity squared (e.g., windage), and D represents the grade coefficient (e.g., slope of the grade). It should be noted that a load coefficient based on velocity cubed may be added if desired). V represents the vehicle velocity and W represents the vehicle weight.

The purpose of the dynamometer is to impose those forces on the vehicle which the vehicle would incur during actual operation on a road. Such dynamometers include a roll (or a pair of rolls) for engaging the driven wheel (e.g., motorcycle) or wheels (e.g., automobile, truck, bus etc.) of the vehicle being tested. It should be noted that where 4 or 6 wheel drive vehicles are to be tested the dynamometers will include 2 or 3 pairs of rolls. The roll or rolls are generally supported by a shaft at each end of the roll which is journaled in a bearing mounted on a frame.

Typically a power absorbing and supplying unit such as an electric motor or a power absorber per se such as an eddy current brake, friction brake or hydrokinetic brake is coupled to the roll for absorbing power from the roll. The roll in turn applies a retarding force to the surface of the vehicle wheel (e.g., tire) to simulate the road load and inertial forces. Inertial forces can be simulated by an electric motor during acceleration as well as deceleration but can only be simulated by a power absorber/brake during acceleration because such braking units only absorb and do not supply power.

Generally (and often when electric motors are used) a large part of the inertial forces are simulated by selectively coupling the roll to one or more mechanical flywheels. The combined inertia of the flywheels, the roll and other rotating components exert a force on the vehicle wheels proportional to the acceleration (or deceleration) of the vehicle wheels. Thus, the engine is required to expend as much power in accelerating the roll as it does in overcoming the vehicle inertia during actual road acceleration. Road load and inertial forces which must be simulated by the dynamometer may be calculated from the formula:

$$F = A + BV + CV^2 + DW + I\frac{dv}{dt}$$

wherein I represents the simulated inertia, dv/dt the derivative of velocity with respect to time (or the acceleration or deceleration of the vehicle).

While electric motors (power supplying and absorbing units) increase the versatility of a dynamometer they also significantly increase the cost. For that reason, dynamometers equipped with power absorbers which provide braking only are in considerable demand for mass vehicle emission testing stations, mandated by the U.S. Environmental Protection Agency ("EPA"), as well as for facilities which must provide the necessary repairs so that rejected vehicles can pass a renewed emissions test. Both friction brake and eddy current brake dynamometers are typically less expensive to manufacture than dynamometers equipped with electric motor or hydrokinetic absorbers. However, friction brakes are subject to wear and thus require considerable maintenance. Eddy current brake dynamometers do not suffer the wear problems associated with friction brake machines and are particularly cost effective for EPA mass-in-service testing for vehicle emissions and repair applications.

Dynamometers utilizing an eddy current brake (or other power absorbing units) can be designed with a base or minimum inertia i.e., the smallest vehicle inertia which can be simulated and a maximum inertia, i.e., the largest inertia which can be simulated. The minimum dynamometer inertia is made up of the inertia of the roll or roll set, the inertia of the rotating components of the absorber and a trim inertia. The term roll or roll set inertia, as used herein, shall mean the rotational inertia of the roll or roll set which engages the vehicle wheel(s) plus the inertia of minor inertia contributing auxiliary components such as the shaft(s), couplings and gears or belts, where used, which are permanently connected to the roll. The inertia of such auxiliary components is less than that of the roll or roll set.

The trim inertia in a typical dynamometer is that inertia required to bring the total inertia of the parts of the dynamometer permanently connected to the rolls up to the designed minimum inertia. The trim inertia in a dynamometer utilizing an eddy current brake (or other power absorbing unit) is typically made up of a fixed flywheel, i.e., a mechanical flywheel permanently connected to the roll. As an example, an eddy current brake dynamometer designed to test motor vehicles weighing 2000 pounds or more would include a roll set inertia of say 300 pounds, a braking unit inertia (i.e., the rotor inertia) of say 200 pounds and a fixed flywheel inertia of 1500 pounds. Additional flywheels, clutched to the roll shaft, generally make up the difference between the dynamometer's minimum inertia (e.g., 2000 pounds) and its maximum inertia (e.g., 5000 to 6000 pounds). It should be noted that the braking unit per se may be used to simulate the difference between the base and maximum inertia during acceleration only, as pointed out above.

Eddy current brakes comprise a rotating wheel made of a suitable electrically and magnetically conducting material with sufficient strength to withstand the centrifugal and other forces encountered. Stationary field coils are positioned adjacent the rotor for generating an exciting magnetic field which in turn induces eddy currents in the rotating rotor. Eddy currents generate the secondary high density magnetic field in a gap between rotor and coils which causes the absorber to apply a braking torque to the roll and to the vehicle tire in contact with the roll. The amount of braking torque is determined by the density of the magnetic field which is controlled by the current supplied to the field coils.

Typical eddy current brakes are designed to minimize the rotor mass so that energy is not wasted in accelerating or decelerating extra mass.

In our prior applications we pointed out that contrary to the prevailing view, there are advantages to increasing the rotor mass of an eddy current brake so that the brake rotor makes up the dynamometer's trim inertia. The advantages include the elimination of the need for a separate trim inertia flywheel (and bearings) and the accommodation of higher power absorptions. Also, the large rotor mass results in a lower magnetic field strength, lower power consumption and lower magnetic saturation of the rotor iron as compared with a conventional eddy current brake having a comparable short term braking capacity. In our prior applications the eddy current brake was rotatably mounted on the dynamometer frame and connected to the roll which engages the driven wheel of the vehicle through a suitable coupling. We have since discovered that the inclusion of the brake rotor as an integral part of the roll provides additional advantages in terms of reducing the material costs, labor cost and the overall length of the dynamometer.

SUMMARY OF THE INVENTION

A chassis dynamometer for simulating the inertial and road load forces of motor vehicles includes a frame, at least one roll (preferably at least two rolls, comprising a roll set) for engaging the driven wheel(s) of the vehicle and a combined power absorbing and inertia simulating unit with a shaft, an electrically conducting (preferably made of low carbon steel) rotor wheel mounted on the shaft for rotation therewith and a stator assembly. The roll and rotor wheel are secured together in an integral arrangement and rotatably mounted on the frame by a pair of spaced bearings. Preferably the bearings are located at each end of the integral arrangement. The rotor is preferably in the form of a drum open at one end with a cylindrical braking section having an inner surface. The stator assembly includes a hub surrounding and preferably rotatably mounted on the shaft with a plurality of symmetrically arranged, electromagnetic cores extending radially from the hub and terminating in pole pieces adjacent the inner surface of the braking section. A field coil is wound on each core.

A force transducer may be coupled between the frame and the stator assembly for providing a measure of the force applied to the roll by the power absorbing unit minus the force attributable to the dynamometer parasitic losses. A speed encoder provides a measure of the roll speed. A conventional controller responsive to the roll speed and the force applied to the roll, may be used to supply current to the field coils in accordance with a selected simulated inertia and road load force for the vehicle.

The features of the present invention can best be understood by reference to the following description taken in conjunction with the accompanying drawings wherein like reference numerals indicate like components.

BRIEF DESCRIPTION OF THE DRAWINGS

FIG. 4 is a cut-away perspective view of the eddy current brake/inertia unit; and FIG. 5 is a diagrammative view of an alternative embodiment of the present invention in which an eddy current brake/inertia unit is secured integrally to each end of the roll.

DESCRIPTION OF THE PREFERRED EMBODIMENT

Figure 1:
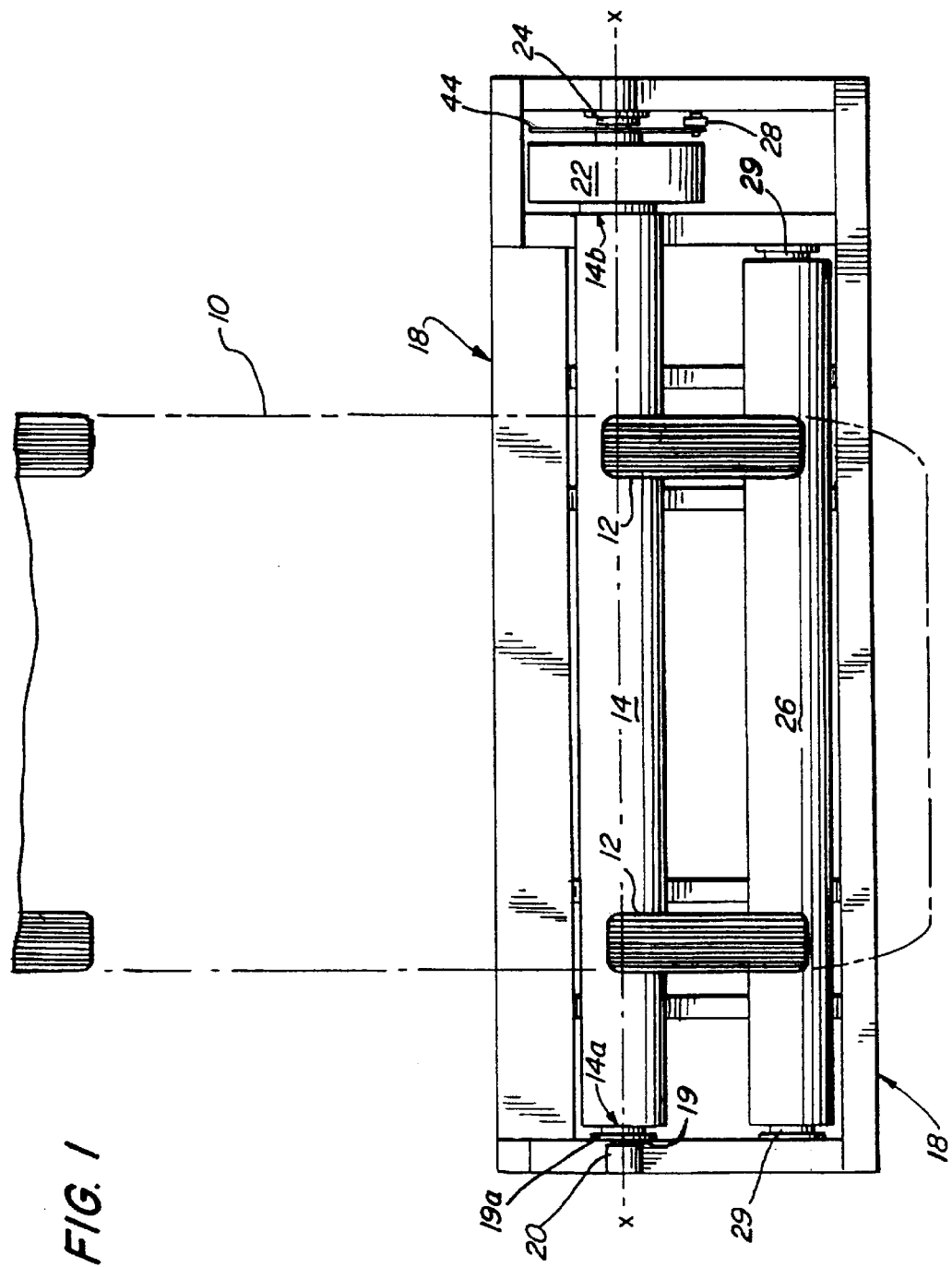
FIG. 1 is plan view of a dynamometer apparatus in accordance with the present invention with a motor vehicle shown positioned thereon in dashed lines.
Figure 2:
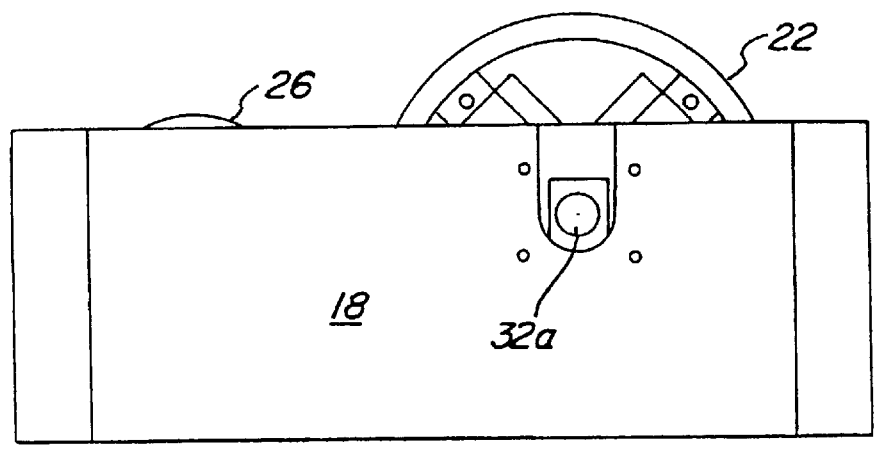
FIG. 2 is an end view of the apparatus of FIG. 1.

Referring now to the drawings and more particularly to FIGS. 1 and 2, there is illustrated a dynamometer in accordance with the present invention for simulating the inertia and road load forces of a motor vehicle 10 having rear wheels 12 (or front wheels) which are driven by the vehicle engine. A tubular roll 14 having an outer wheel engaging surface 14b for engaging and applying a braking torque (or force) to the wheels 12 is rotatably mounted at one end (14a) to a frame 18 via a stub shaft 19 and bearing 19a. The roll 14 is secured at its other end (or second end) 14b to the rotor of an eddy current brake 22 (power absorber/inertia simulating unit). The free end of the shaft 32a which supports the second end of the roll 14, is rotatably mounted to the frame via bearing 24, as will be explained in more detail. The roll 14 and brake rotor are aligned along a rotational (or longitudinal) axis x—x. An idler roll 26 is also rotatably mounted at each end on the frame via bearings 29. Belts (or chains, not shown) couple the rolls 14 and 26 so that they will rotate in unison. The rolls form a cradle to support the vehicle wheels 12 in a conventional manner.

A conventional load cell 28, (i.e., a strain gauge) is mounted between the stator assembly of the brake/inertia unit 22 and the frame for providing a signal representative of the force applied by the vehicle wheels 12 to the roll 14 minus the force attributable to the dynamometer parasitic losses. A conventional speed encoder 20, connected to the shaft 19, supplies a signal representative of speed of the roll 14. The force and speed signals may be supplied to a conventional power controller (not shown) which supplies current to the field coils (to be described) of the brake/inertia unit to cause that unit to apply a braking force (or torque) to the roll 14 and the wheels 12 (after compensating for parasitic losses) in accordance with a selected vehicle inertia and road load for the vehicle 10 in a well known manner. See, for example, U.S. Pat. No. 5,101,660.

Figure 3:
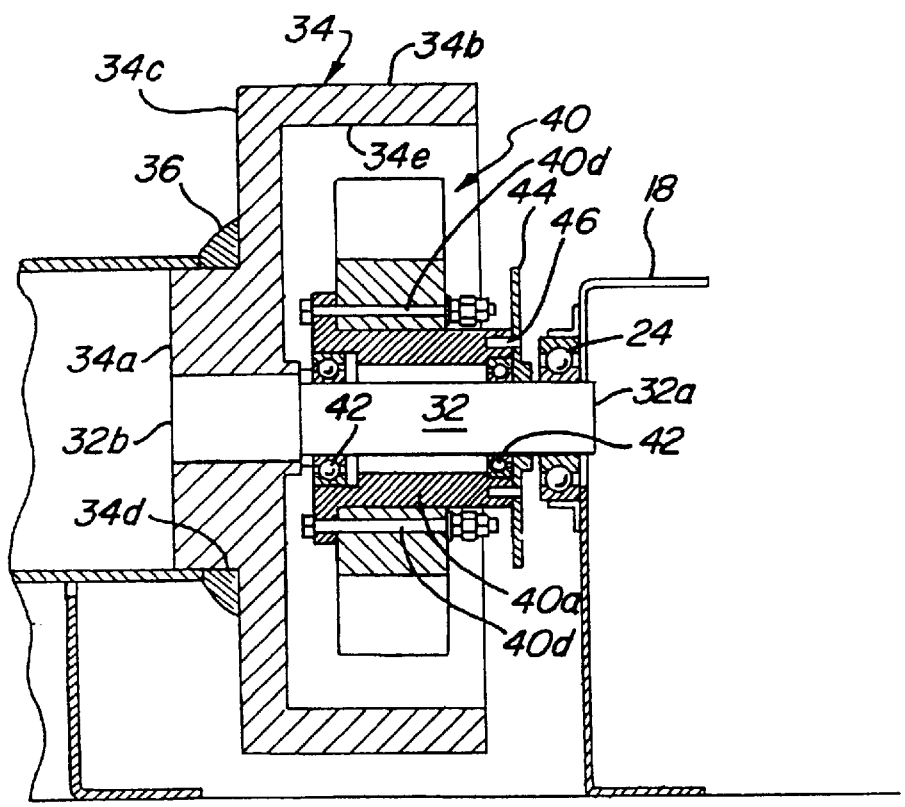
FIG. 3 is a cross-sectional view of the eddy current brake/inertia unit incorporated into the apparatus of FIG. 2.

Referring now to FIG. 3, the eddy current brake/inertia unit 22 includes a shaft 32 having a free end 32a which is rotatably mounted on the frame 18 via bearing 24. The other end 32b of the shaft 32 is press fit and keyed to a cylindrical hub section 34a of a rotor wheel 34 for rotation therewith. The rotor wheel 34, is shaped like a drum, open at the end adjacent the free end 32a of the shaft 32, with a hollow braking section 34b extending axially from the open end to a web section 34c. The web section 34c extends radially inward to the hub 34a. The hub 34a includes a cylindrical shoulder 34d which extends axially away from the open end of the drum-shaped rotor 34. The second end 14a of the roll 14 is fitted over a portion of the shoulder 34d and is secured thereto, i.e., by a filet weld 36, to form the roll and rotor into an integral unit. The roll and brake rotor are preferably made of steel.

As is illustrated in FIGS. 1 and 3, the rotor 34 and in particular the braking section 34b thereof, extends axially away from the wheel engaging surface 14b of the roll. The braking section also extends radially outwardly of the hub 34a and the wheel engaging surface 14b of the roll. This arrangement serves to isolate, to a large extent, the considerable heat generated in the braking section (during the operation of dynamometer) from the wheel engaging surface of the roll (and the vehicle tires in contact therewith).

Referring now to FIGS. 3 and 4, the stator assembly 40 of the brake/inertia unit 22 includes a tubular hub 40a which surrounds the shaft 32 and is rotatably mounted thereon via bearings 42. Four symmetrically arranged laminated cores 40b extend radially outwardly from the hub 40a and terminate in arcuate-shaped pole ends or pieces 40c adjacent the inner surface 34e of the cylindrical braking section 34b of the rotor 34. Suitable bolts 40d secure the laminated core structure to the hub as shown. Field coils 40e (not shown in FIG. 3) are wound or the cores 40b in a conventional manner as is illustrated in FIG. 4 to complete the four pole stator assembly.

A bracket 44 is connected to the stator hub via bolts 46 and secured to the frame 18 through the load cell 28 to prevent rotation of the stator in a conventional manner. The load cell measures the torque on the stator assembly and thus provides a measure of the vehicle wheel/roll interface force minus the parasitic losses as discussed earlier.

It should be noted that the stator assembly 40 need not be mounted on the shaft 32 via bearings 42, but may be rotatably mounted directly on the frame, for example, securing the hub 40a to a sleeve surrounding the shaft 32 with the sleeve being pivotally connected to the frame. The bearing 24 would then support the rotor and one end of the roll. Such an alternate stator assembly support, while more expensive than the simple arrangement shown in FIG. 3, may be useful where a measurable deflection of the roll and rotor shaft is anticipated due to very vehicle heavy loads.

The field coils are energized with d.c. current in a conventional manner resulting in adjacent coils and pole pieces producing a magnetic circuit and forcing eddy currents to be developed in the rotor wheel.

Combining the roll and brake rotor into an integral unit so that the unit is rotatably supported on the frame by only two bearings provides significant savings in manufacturing costs over the arrangement shown in our prior applications. Specifically, our improvement saves one shaft, i.e.,the shaft located at the end of the conventional roll, one coupling, i.e., the coupling which connects the absorber to the roll shaft, two bearings, i.e., the bearings supporting the shafts at one end of the roll and at one end of the absorber, six to eight inches of frame length needed for the extra bearings and coupling, a balancing operation and the procedure for aligning the roll shaft to the absorber shaft.

As discussed in our previous applications, the rotational inertia of the eddy current brake rotor may be within 50 to 90% or preferably within 70% to 90% of the base or minimum inertia and 20% or more of the designed maximum inertia of dynamometer.

It is to be understood that additional flywheels (either fixed or clutchable) may be connected to the rotor shaft 32 of the eddy current brake. Where extra heavy loads are to be handled i.e., in excess of 8,000 pounds, split rolls, such as rolls 14 in the '259 application may be used with the rotor of an eddy current brake secured in an integral manner to the outside end of each roll, if desired. Also, an additional brake/inertia may be placed between the two split rolls, as long as the diameter of the brake rotor is small enough to provide adequate clearance to accommodate the underside of the vehicle being tested.

FIG. 5 illustrates an alternate embodiment of the invention in which an eddy current brake/inertia unit 22' is located at each end of a roll 14' which is arranged to engage the driven wheel of a vehicle. The eddy current brakes 22' may be identical to the unit 22 shown in FIGS. 3 and 4. The rotor of such brake/inertia units will be secured to the respective ends of the roll 14' in the same manner as that illustrated in FIG. 3. The units may be controlled to always operate simultaneously or may be controlled so that one unit operates over a lower absorption rate i.e., 0–300 h.p., with both units operating when the required absorption rate exceeds that value. Additional power absorption units like 22 could also be connected to the idler roll 26', if desired.

The chassis dynamometer of FIG. 5 includes a fixed flywheel 50 permanently coupled to an extension of the rotor shaft of the right hand unit 22'. Another flywheel 52 is mounted on the shaft extension via a bearing (not shown) and may clutched, via clutch 54, to rotate with the shaft and roll. Additional flywheels may be added as desired.

The mass of the braking section of the rotor and the current rating of the field coils, primarily determine the braking capacity of the eddy current brake/inertia unit of our invention. We have tested a unit which absorbs up to 750 h.p. for several minutes, sufficient for most truck testing procedures, before the heat in the rotor becomes a problem. It should be noted that, while a four pole stator assembly has been disclosed, the number of poles can be less or greater than four.

There has thus been described an improved chassis dynamometer utilizing one or more eddy current brakes to absorb power from the vehicle under test and to simulate a significant portion of the vehicle inertia. The novel dynamometer saves considerable manufacturing costs as well as overall length of the unit. Various modifications of the apparatus will occur to persons skilled in the art without involving any departure from the spirit and scope of our invention as set forth in the appended claims.

What is claimed is:

1. A chassis dynamometer, for simulating inertia and road load forces for a motor vehicle having at least one driven wheel, comprising:

a) a frame;

b) at least one roll having a longitudinal axis, a first and second end and a wheel engaging surface for contacting the driven wheel of the vehicle;

c) an eddy current brake for absorbing power from the vehicle driven wheel to simulate road load forces and also vehicle inertia during an acceleration of the driven wheel, the brake including a shaft with at least one free end, a rotor supported on the shaft for rotation therewith and a stator assembly having at least one field coil for inducing eddy currents in the rotor, the stator assembly being coupled to the frame to remain stationary relative to the rotor and roll, the rotor being secured to the second end of the roll to form an integrated unit comprising the roll and rotor, the rotor extending radially outwardly from the wheel engaging surface of the roll and comprising at least 50% of the minimum inertia of the dynamometer; and d) first and second spaced bearings for rotatably supporting the first end of the roll and the free end of the brake shaft on the frame, respectively, whereby the roll and brake rotor are supported relative to the frame only at the first end of the roll and the free end of the shaft.

2. The invention of claim 1 wherein the stator assembly is mounted on the shaft so that the shaft can rotate relative to the stator.

3. The invention of claim 1 wherein the rotor further extends axially away from the wheel engaging surface of the roll.

4. The invention of claim 2 wherein the rotor is in the form of a drum open at one end with a hollow braking section extending radially inwardly to a hub mounted on the shaft, the braking section extending axially away from the hub.

5. The invention of claim 4 wherein the rotor hub includes a cylindrical shoulder and wherein the roll is secured to the cylindrical shoulder of the rotor hub.

6. In a chassis dynamometer for simulating motor vehicle inertial and road load forces, the dynamometer including a frame, at least one roll having a longitudinal axis and an outer wheel engaging surface for engaging at least one driven wheel of the vehicle and an eddy current brake for applying a braking force to the roll to simulate the road load forces and the vehicle inertia during acceleration, a load cell for providing a measure of the force applied to the vehicle wheel minus the force attributable to the dynamometer parasitic losses, a speed encoder for providing a measure of the roll speed and a controller, the improvement of the roll and eddy current brake comprising:

the eddy current brake having a longitudinal axis, a shaft with a free end, a rotor and a stator assembly, the rotor being secured to one end of the roll for rotation therewith and having a braking section extending axially away from the wheel engaging surface of the roll along the longitudinal axis, the stator assembly having at least one field coil positioned adjacent the braking section of the rotor, the brake rotor and roll forming a unitary structure with only the free end of the rotor shaft and said other end of the roll being rotatably supported relative to the frame.

7. The invention of claim 6 wherein the braking section of the rotor extends radially outwardly from the wheel engaging surface of the roll to substantially isolate heat generated in the braking section from the wheel engaging surface of the roll.

* * * * *